US012162569B2

(12) United States Patent
Atherton et al.

(10) Patent No.: US 12,162,569 B2
(45) Date of Patent: Dec. 10, 2024

(54) CALCULATION OF ROLL PERIOD FOR A VESSEL

(71) Applicant: Atherton Dynamics, LLC, Incline Village, NV (US)

(72) Inventors: Hunter Atherton, Bolling AFB, DC (US); Matthew Kempe, Kailua, HI (US); Dianna Garfield, Oakdale, CT (US); Andrew Zuckerman, Essex, CT (US); Philip Broder, Katy, TX (US)

(73) Assignee: Atherton Dynamics, LLC, Incline Village, NV (US)

( * ) Notice: Subject to any disclaimer, the term of this patent is extended or adjusted under 35 U.S.C. 154(b) by 761 days.

(21) Appl. No.: 17/243,329

(22) Filed: Apr. 28, 2021

(65) Prior Publication Data

US 2021/0394875 A1    Dec. 23, 2021

Related U.S. Application Data

(60) Provisional application No. 63/016,483, filed on Apr. 28, 2020.

(51) Int. Cl.
*B63B 79/10* (2020.01)
*B63B 39/14* (2006.01)
(Continued)

(52) U.S. Cl.
CPC ............. *B63B 39/14* (2013.01); *B63B 45/04* (2013.01); *B63B 79/10* (2020.01); *B63B 79/30* (2020.01); *B63B 79/40* (2020.01); *G01P 15/18* (2013.01)

(58) Field of Classification Search
CPC .......... B63B 39/14; B63B 45/04; B63B 79/10; B63B 79/30; B63B 79/40; B63B 49/00; G01P 15/18
See application file for complete search history.

(56) References Cited

U.S. PATENT DOCUMENTS

| 1,859,846 A | 5/1932 | Rue |
| 2,431,405 A | 11/1947 | Kristal et al. |

(Continued)

FOREIGN PATENT DOCUMENTS

WO    WO 2017/205916 A1    12/2017

OTHER PUBLICATIONS

J. Marine Sci. Appl. (2015)14: 406-412 DOI: 10.1007/s11804-015-1331-9 The Application of a Smartphone in Ship Stability Experiment National Cargo Bureau, Inc NY, NY 1989.

*Primary Examiner* — Khoi H Tran
*Assistant Examiner* — Bryant Tang
(74) *Attorney, Agent, or Firm* — Ian Burns; ATIP Law

(57) ABSTRACT

A portable sensing device may be deployed for determining at least one stability metric of a vessel. The sensing device may include one or more motion sensors for sensing motion of the vessel, one or more freeboard sensors for determining a freeboard of the vessel, and a computing system for processing motion data from the one or more motion sensors and freeboard data from the one or more freeboard sensors to determine the at least one stability metric. The computing system may be programmed to transform the motion data from time domain motion data to frequency domain motion data and process the frequency domain motion data to determine the at least one stability metric of the vessel and the freeboard of the vessel.

29 Claims, 13 Drawing Sheets

(51) Int. Cl.
*B63B 45/04* (2006.01)
*B63B 79/30* (2020.01)
*B63B 79/40* (2020.01)
*G01P 15/18* (2013.01)

(56) References Cited

U.S. PATENT DOCUMENTS

| | | |
|---|---|---|
| 3,982,424 A | 9/1976 | Peach |
| 4,918,628 A * | 4/1990 | Griffin .................... B63B 39/14 |
| | | 340/623 |
| 6,883,246 B1 * | 4/2005 | Latham .................... G01B 5/14 |
| | | 33/720 |
| 2016/0114867 A1 | 4/2016 | Nicol |
| 2016/0260058 A1 | 9/2016 | Benjamin et al. |

* cited by examiner

| ENERGY VARIANCE | NORMALIZED ENERGY VARIANCE LOWER BOUND | NORMALIZED ENERGY VARIANCE UPPER BOUND | STDEV OF MEASUREMENT |
|---|---|---|---|
| <.009 | 0 | 0.1 | 0.881806437 |
| >.009 | 0.1 | 0.2 | 0.034359214 |
| >.009 | 0.2 | 0.3 | 0.060880083 |
| >.009 | 0.3 | 0.4 | 0.064589941 |
| >.009 | 0.4 | 0.5 | 0.033811803 |
| >.009 | 0.5 | 0.6 | 0.000752016 |
| >.009 | 0.6 | 0.7 | 0 |
| >.009 | 0.7 | 0.8 | 0 |
| >.009 | 0.8 | 0.9 | NO MEASUREMENTS |
| >.009 | 0.9 | 1 | NO MEASUREMENTS |

CALCULATION OF ROLL PERIOD FOR A VESSEL

CROSS REFERENCE TO RELATED APPLICATIONS

This application claims priority to U.S. Provisional Patent Application No. 63/016,483 filed 28 Apr. 2020, the entire contents of which are incorporated herein by reference.

FIELD OF THE INVENTION

The present invention relates to apparatus and methods for determining the stability of a maritime vessel.

BACKGROUND OF THE INVENTION

In maritime operations, the stability of a vessel is obviously an important factor. Current ship modeling systems use nothing more than math and blueprint dimensions to approximate stability. FIGS. 1A and 1B demonstrate the theory behind ship stability. In FIG. 1A, a vessel 110 floating in a body of water 120 has a Metacenter M 112 that, as shown in FIG. 1B, is the point around which the vessel's center of buoyancy rotates, like a pendulum, as the vessel heels. This is generally only true for angles of heel of 10 degrees or less. The vessel has a center of gravity G 114 and a center of buoyancy B 116.

The Metacentric Height (GM) is the paramount stability metric for ship operators for assessing stability of a floating body. The Metacentric Height is the linear distance between the body's center of gravity (G) and metacenter (M) and reflects the initial static stability of a floating body. The Metacentric Height is particularly critical to vessels with a frequently changing center of gravity G, such as merchant vessels, fishing vessels, and passenger ferries. The Metacentric Height also becomes vital when a vessel encounters damage. Every ship would have its own 'safe range' for GM. When GM gets too low, the stability is in danger, when it gets too high, the 'snappy' rolling motion can actually injure personnel.

There can be numerous circumstances where a person encounters a vessel and would like to be able to quickly determine whether it is safe to remain aboard and/or operate the vessel. For example, during search and rescue or law enforcement operations, there may be a requirement to board a vessel for which there is no previous knowledge of the design or loading state of the vessel.

Current GM modelling systems are expensive, cumbersome and require significant training. Further, the systems require many inputs that make obtaining accurate assessments quickly virtually impossible. For example, the US Navy Flooding Casualty Control Systems (FCCS) requires fuel and water tank levels, knowledge of cargo and personnel, damage reports which are often speculative or incomplete, and load plans which may be inaccurate. The system has a very high purchase price making it prohibitive for smaller operations.

What is required is an improved apparatus, system and method for calculating vessel stability information.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to calculate a stability metric of a floating body;
provide a quick calculation of vessel stability;
the ability to use real-time measured data to obtain a vessel stability indication;
provide a cost-effective apparatus for determining vessel stability;
provide a portable device that can be quickly installed on a vessel to obtain a vessel stability measurement;
provide a low cost device that can be owned by a person or team that move from ship to ship;
provide the ability to quickly assess the residual stability of a vessel, which could be used in conjunction with the roll period and/or metacentric height to rapidly assess the safety of a vessel's current loading state.

These and other advantages may be realized by reference to the remaining portions of the specification, claims, and abstract.

Brief Description of One Embodiment of the Present Invention

In one aspect of the present invention, there is provided a portable sensing device for determining at least one stability metric of a vessel. The sensing device may include one or more motion sensors for sensing motion of the vessel, one or more freeboard sensors for determining a freeboard of the vessel, and a computing system for processing motion data from the one or more motion sensors and freeboard data from the one or more freeboard sensors to determine the at least one stability metric. The computing system may be programmed to transform the motion data from time domain motion data to frequency domain motion data and process the frequency domain motion data to determine the at least one stability metric of the vessel and the freeboard of the vessel.

In one embodiment, the motion data may be transformed into roll period data.

In one embodiment, the portable sensing device may include a housing that can be detachably mounted to a vessel, wherein the housing houses the one or more motion sensors and the computing system.

In one embodiment, the portable sensing device may include an interface for receiving an input of a beam width of the vessel.

In one embodiment, the computing system is programmed to convert a roll period into a metacentric height of the vessel.

In one embodiment, the portable sensing device may include a display for displaying at least one of a roll period of the vessel and a metacentric height of the vessel.

In one aspect of the present invention, there is provided a method for determining at least one stability metric of a vessel. The method may include locating a portable sensing device at a location on the vessel, the sensing device including one or more motion sensors for sensing motion of the vessel and a computing system for processing motion data from the one or more motion sensors to determine the at least one stability metric of the vessel. The method may include operating the sensing device for a period of time to produce an initial indication of the roll period of the vessel, determining a freeboard of the vessel, and determining stability state of the vessel from the roll period and the freeboard.

In one embodiment, the period of time to produce the initial indication is less than 5 minutes.

In one aspect, there is provided a system comprising at least one device that is programmed to interface directly or indirectly with a third party system of a vessel comprising one or more third party sensors to receive raw motion data and freeboard data from the one or more third party sensors, transform the motion data into at least one stability metric comprising at least one of a roll period of the vessel or a metacentric height of the vessel, and combine the stability metric and the freeboard data to determine a stability state of the vessel.

In one aspect, there is provided a method for determining at least one stability metric of a vessel. The method may include locating a portable sensing device at a location on the vessel, the portable sensing device including one or more motion sensors for sensing motion data of the vessel and a computing system for processing motion data from the one or more motion sensors to determine a roll period of the vessel. The sensing device may be operated for a period of time to produce an indication of the roll period of the vessel. The method may further comprise ascertaining the precision or accuracy of the sensed roll period and determining the at least one stability metric of the vessel from the roll period.

In one aspect, there is a computer readable medium comprising instructions executable by at least one processer that, when executed, cause the at least one processor to interface directly or indirectly with a third party system of a vessel comprising one or more third party sensors to receive raw motion data from the one or more third party sensors and freeboard data from the one or more third party sensors, transform the motion data into at least one stability metric comprising at least one of a roll period of the vessel or a metacentric height of the vessel, and combine the stability metric and the freeboard data to determine a stability state of the vessel.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Current ship modeling systems use nothing more than math and blueprint dimensions to approximate stability. In embodiments of the present disclosure, there is provided an apparatus that can convert real-time measurements from various sensors into a calculation of ship stability. By relying on real-time data rather than historical information and incomplete or speculative reports, the accuracy and effectiveness of stability assessments can be increased.

Figure 2:
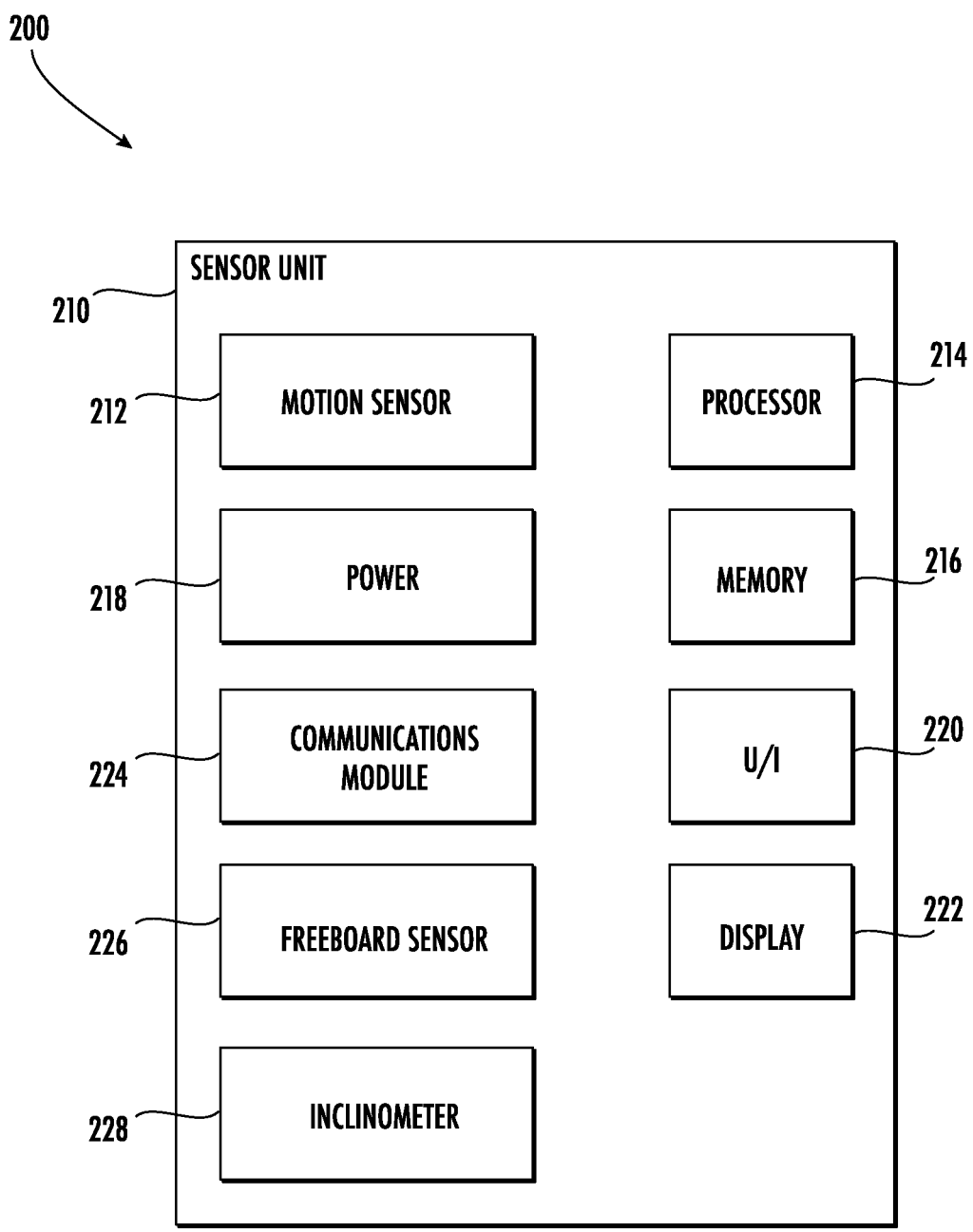
FIG. 2 schematically depicts components of a stability assessment system within a housing.

FIG. 2 illustrates a stability assessment system 200 for assessing stability of a vessel in accordance with one embodiment of the present application. The system 200 includes a housing 210 that houses one or more motion sensors 212. The motion sensors 212 may include any suitable motion sensor that is able to detect oscillation of a floating vessel and determine roll rate of the vessel. Computing components forming a signal processing system receive the motion data from the sensors and process the motion data into a roll period. Roll rate (usually in radians/second) is typically one of the outputs of basic motion sensors, and requires no processing. Actual roll data (usually in radians) may require extensive processing. Roll rate, roll, (and also acceleration and magnetometer data) may all be usable as metrics that can be transformed into a roll period.

Roll period is related to the Metacentric Height (GM) of the vessel by the formula:

$$T = \frac{2\pi k}{\sqrt{gGM}} \qquad \text{(Equation 1)}$$

Where:
T=Roll Period
k=Radius of Gyration (may be approximated from vessel's breadth moulded beam [width])
g=Gravitational Acceleration (9.81 m/s^2)
GM=Metacentric Height The "breadth moulded" used to derive the k value is similar to the beam width but provides a more precise measurement. The "breadth moulded" is considered to be the maximum beam, or breadth, of the ship measured inside the inner shell strakes of plating, and usually occurs amidships. In one embodiment, k may be derivable from beam width.

Users of varying levels of sophistication may know their vessel's beam, or their breadth moulded, or their actual radius of gyration. The computing systems may have an interface that enables the user to input any of the beam, breadth moulded or radius of gyration to be used in the roll data period calculation.

Equation 1 shows an inverse relationship between the roll period and the metacentric height. Thus, roll period can be used as an indicator of vessel stability. Importantly, changes in the roll period as a vessel undergoes changes in conditions, e.g. due to an increasing or decreasing load, shifting in location of the load, damage to the vessel, etc. can provide an indication as to whether a vessel is becoming more or less stable and may be used to indicate or predict critical instabilities before they occur.

Equation 1 above utilizes the radius of gyration, k, in the calculation of roll period. In an alternative embodiment, roll period may be calculated from the following equation:

$$T = \frac{C \times B}{\sqrt{GM}} \quad \text{(Equation 2)}$$

Where:

B=Breadth moulded (or beam width); and

C is a semi-standard constant for different types of vessels that can be input during initial program setup and left unchanged thereafter.

While Equation 2 is generally cruder than Equation 1, both equations can be used to generate a meaningful metacentric height calculation.

In one embodiment, the motion sensor may be a simple pendulum with basic signal processing. In a more enhanced embodiment, the motion sensor may include one or more micro-electromechanical systems (MEMS) that incorporate one or more gyros and/or accelerometers. In a particular embodiment, the MEMS sensors may include sensors for 3-axis, 9 degree of freedom motion detection. The motion sensors may detect motion and provide an output signal to a signal processing system.

The computing components that make up the signal processing system may be a dedicated and integrated computer including at least one processor 214 and at least one memory 216 operatively associated with the processor. The memory 216 may include storage memory, i.e. read-only memory, that can store programs, applications, libraries, instruction sets, that can be executed by the processor(s). The memory 216 may also include random access memory (RAM) for use in executing the programs, applications, instruction sets, etc.

In one embodiment, the computer system is programmed to receive input signals, in particular roll rate data, accelerometer data, magnetometer data or calculated roll data, from the one or more sensors 212 and process the signals into one or more parameters, metrics or outputs that are useful in providing an indication of stability of vessel.

In one embodiment, the sensor system and computing components are contained within a single integrated unit, e.g. within a single housing 210. This single unit may have a power supply 218, e.g. from battery, or may have one or more power ports for connecting to an external power source, e.g. through a conventional power plug that connects to a power supply of the vessel, or through a Universal Serial Bus (USB) plug.

The sensing unit 200 may include a user interface 220 that enables a user to provide input data, including calibration data, run times, vessel beam width, known minimum roll period, known maximum metacentric height or any other information required to perform stability metric calculations. The sensing unit 200 may include a display 222 for displaying outputs such as roll period, roll period over time, metacentric height, or other metrics that can be derived from the data of the motion sensors. Additional metrics may include, without limitation, current pitch and roll values (i.e., vessel is currently rolling 8 degrees and pitching 6 degrees, max roll in previous 5 minutes was 9.2, max pitch was 7.) Such metrics may be useful for vessels when attempting to perform stability requiring operations, such as to launch or recover helicopters, as each ship has pitch and roll limits. The sensing unit 200 may also include a communications module 224 that enables data to be received into the unit 200 from external devices and/or for data to be communicated from the unit 200.

The housing 210 may have attachments for detachably securing the housing to the vessel. For example, the housing may have a keyhole that allows the sensing unit to hang on a suitable plug, hook, screw, or similar projection on the vessel. In other embodiments, the housing 210 may engage with a docking station, such as a mobile phone docking station, that is provided on the vessel. The attachments may be arranged so that the housing becomes secured to the vessel in a preferred orientation for measuring roll rate data. Orientation is important and thus the sensor unit 210 may be provided with one or more markings or indicia to define a designated axis of the device housing (phone, tablet, etc.) that is aligned with the ship's longitudinal (fore and aft) axis to ensure that pitch and roll are being detected accurately. Location on the ship is less important with virtually any location on the ship being able to provide a meaningful measurement. That said, if the sensor unit is permanently installed in one location or another, then it may be possible to optimize the algorithm for the specific location, but this is not necessary for basic operation.

In an alternative embodiment, the sensor unit may be separate from the computing components. The sensor unit may include a communications module that communicates output signals to a computer unit through wired (e.g. USB or similar serial line) or wireless (e.g. Bluetooth, RF, WiFi, internet) communications channels. The sensor unit may have its own internal power supply, e.g. battery, or a power port for receiving power from the vessel's power supply or from a computing unit, e.g. via USB connection. The sensor unit 210 may include one or more freeboard sensors 226, the function of which will be described below. The freeboard sensors may be incorporate within the housing of the sensor unit or may be distributed at required locations on the vessel, depending on the particular form of the freeboard sensors. Where distributed freeboard sensors are deployed, the freeboard sensors 226 may communicate with the sensor unit by wired or wireless means. The sensor unit 210 may also include an inclinometer 228 that can be used for a variety of functions, including calibration functions, such as a roll drift calibration as will be described below.

Figure 3:
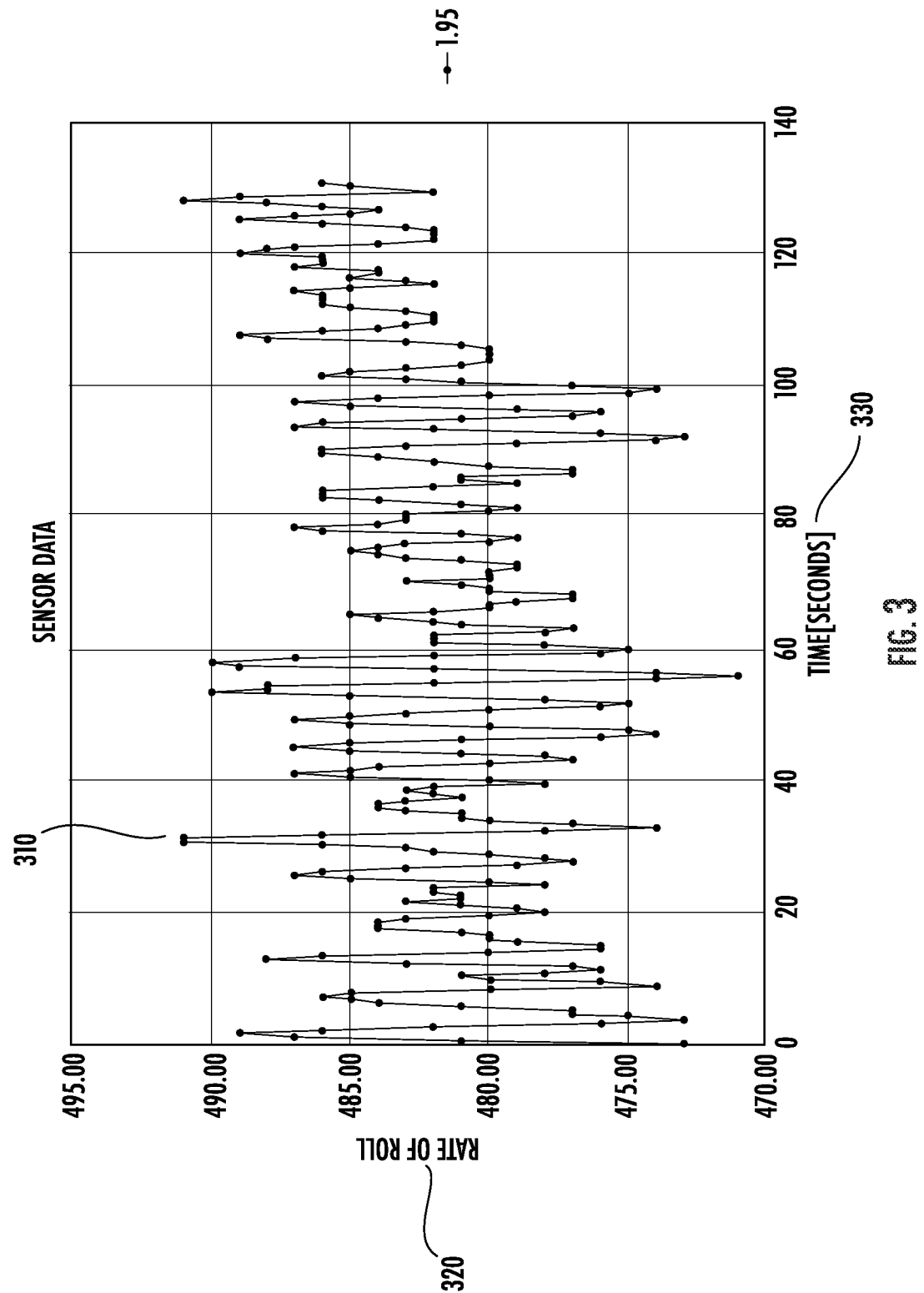
FIG. 3 substantially depicts a graph of motion data in the time domain.
Figure 4:
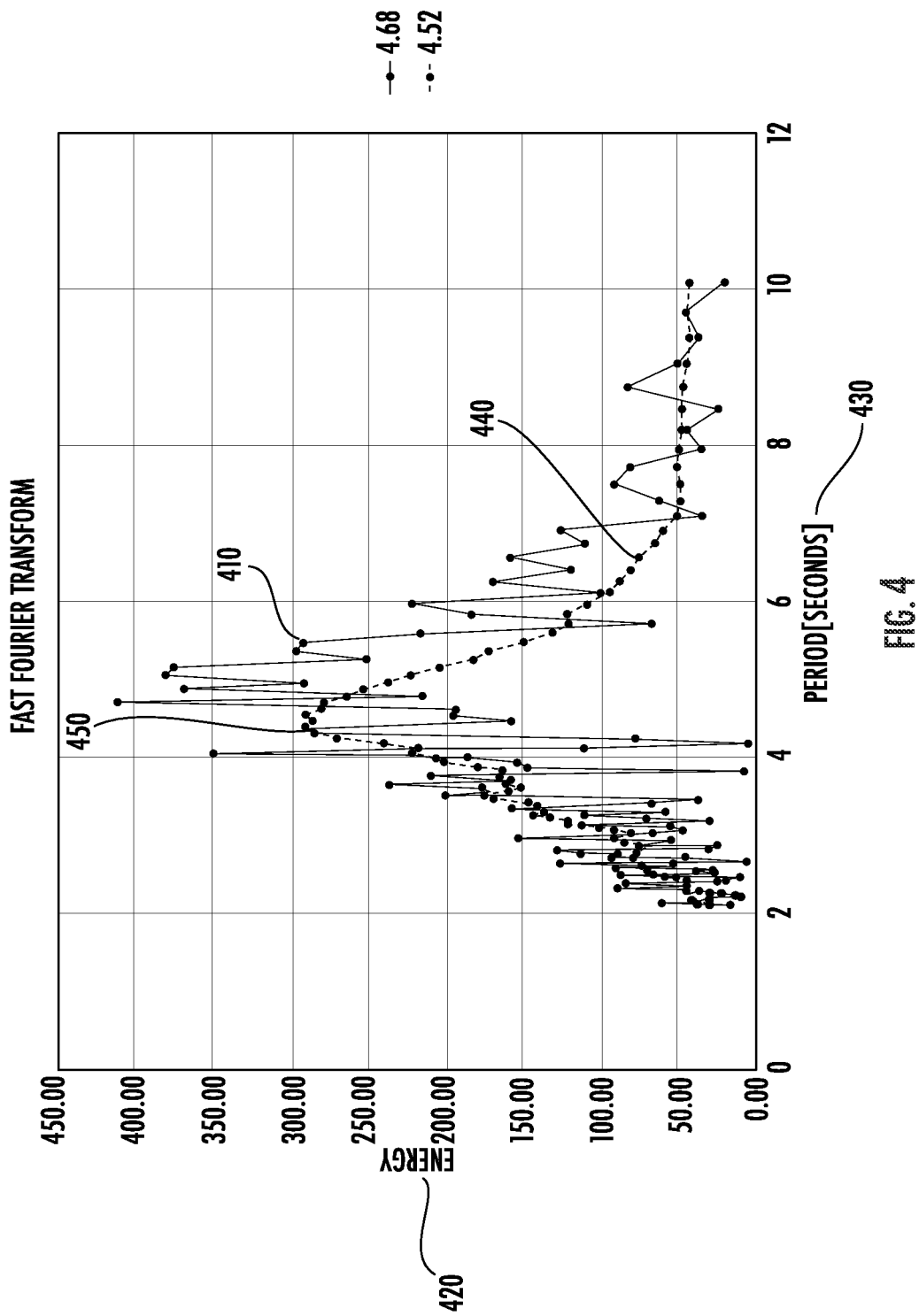
FIG. 4 substantially depicts a graph of energy data against period in the frequency domain.

The MEMS sensors are capable of processing recorded motion into roll data, expressed in degrees per second, degrees, or equivalent dimensions. In one embodiment, the sensors record rate of roll every half second. FIG. 3 shows an example graph 310 of roll rate 320 against time 330. This data can be converted from the time domain to the frequency domain by a mathematical transform operation to express the energy per recorded period. The transform operation may include, without limitation, Fourier transform, Fast Fourier transform (FFT), Fast Discrete Fourier Transform, Optimal Fourier Transform, Discrete Fourier Transform, Welch's Method, Autocorrelation, amongst others. In one embodiment, 4-minute blocks of data are transformed by a Fast Fourier Transform process. FIG. 4 provides an example graph 410 of energy 420 against period 430 derived by FFT of the roll rate v time graph of FIG. 3. Raw data may be filtered to provide a smoothed output 440. In one embodiment, the filtered data 440 may include a simple moving average filter, a weighted moving average filter, a linear regression model, exponential smoothing, a Kalman or similar filter. The roll period is the period 450 having the highest energy in the frequency domain. The validity of the signal may be ascertained by a number of different methods. In one embodiment, the signal dispersion could be assessed, wherein the variance or standard deviation of resultant periods of the strongest signals would provide an indication of signal validity. A high level of signal dispersion would indicate low signal validity, while a low level of signal dispersion would indicate high signal validity. In another embodiment, the energy variance would be assessed, wherein the variance or standard deviation of the energy of the strongest signals could be used. A high level of energy variance would indicate a high signal validity, while a low level of energy variance would indicate low signal validity. In the case of energy variance, the validity figure may be normalized by dividing the energy variance by the energy of the strongest signal. In one embodiment, the top ten signals may be assessed to determine signal dispersion or energy variance.

Figure 5:
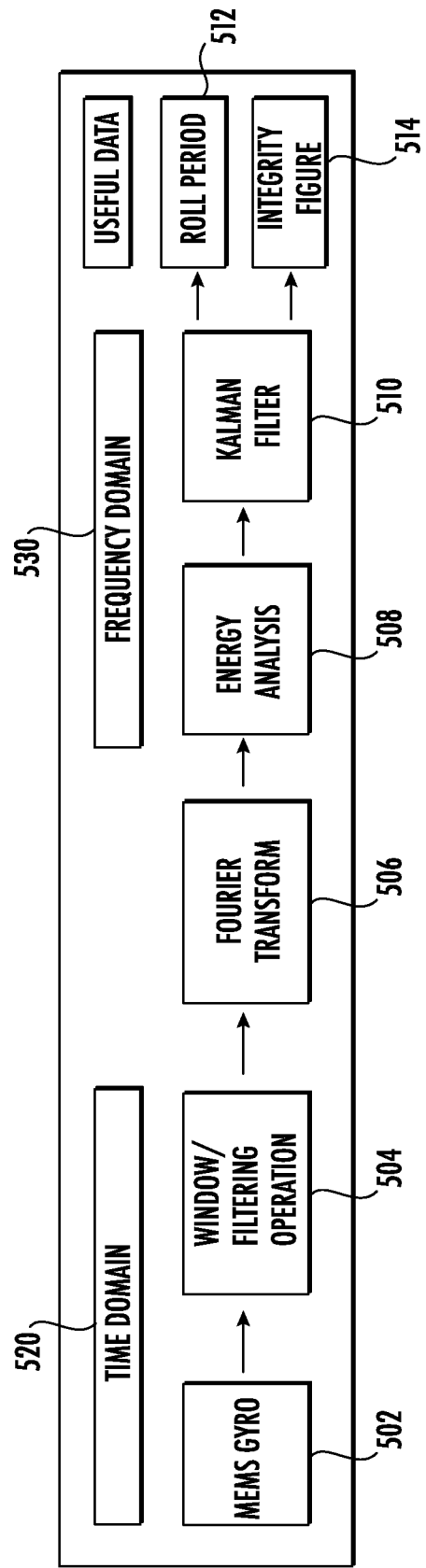
FIG. 5 substantially depicts a process for producing roll period data.

A specific system 500 that illustrates the signal processing functions of the computer system is illustrated in FIG. 5. Signals generated by the MEMS sensors 502 are received into the signal processing computer which performs an initial window/filtering operation 504 on the data to select data within a range of interest, these operations occurring within the time domain 520. The filtered signals then undergo a Fourier (or other similar) transform 506 to transform the data from the time domain into the frequency domain 530. The transform data can then undergo an energy analysis 508 and Kalman filter 510 to calculate the roll period 512 of the vessel. The Kalman filter "smartly" processes the data over time. The Kalman filter may be configured with certain parameters for how quickly roll period can change, and what the roll period's boundaries are. It would incorporate the validity of signal (in energy analysis, 508) to determine probability of accuracy for each data input, and provide optimal data output. While a Kalman filter is described, other data processing techniques may be used to enhance the end result. For example, a weighted moving average filter, or linear regression model may be used. Using an input metrics of the vessel's beam width and type, which can be used to approximate the k value required by Equation 1, or the C value in Equation 2, the roll period data can be further processed into a calculation of the metacentric height GM of the vessel and other integrity data 514. An integrity figure may be derived from the signal validity described above, or may be produced by the Kalman filter, and it provides the user with a representation of the quality of the data being produced, i.e. the level of confidence that accurate roll period data is being generated. The integrity data may be presented as one or more visual depictions of the data, one or more audible alerts, and/or one or more emergency notifications.

Figures 13, 14:
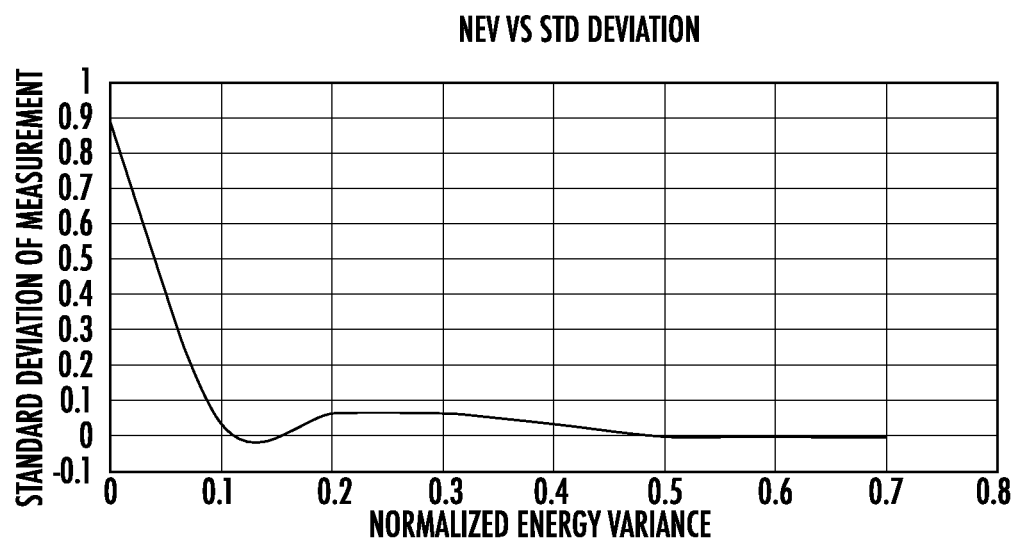
FIG. 13 substantially depicts a table of standard deviation of measurements and energy variance data.
FIG. 14 substantially depicts a graph of the data of the table in FIG. 13.

In practice, the signal validity assessment is a probabilistic assessment of measurement precision vs. Normalized Energy Variance (NEV). Signal validity is important for the user experience, but also important for the processing, due to the large amount of bogus data that can be recorded. In various embodiments, the Kalman filter (or equivalent filter) is the backbone of the algorithm after the FFT, and it requires a probabilistic validity FIG. 514 with each new data point. For example—if the FFT indicates that the Roll Period is 7 seconds, and NEV comes to 0.3. A table which describes the probability (in the form of standard deviation of a large sample set of measurements at NEV=0.3) that a measurement obtained at NEV=0.3 is truly 7 seconds can be utilized in the signal validity assessment. An example table is depicted in FIG. 13. The table data of FIG. 13 has been graphed in FIG. 14 as a plot of Standard Deviation v NEV. NEV informs the Kalman Filter how heavily to weight the new roll period against previous measurements. The Normalized Energy Variance provides a probabilistic validity figure that translates across various vessels.

During very low motion conditions, erroneously high NEV values may occur. To counter, this, an EV (energy variance) cutoff may be utilized. When EV<0.009, the measurement is treated the same as if it had NEV<0.1 (very low precision), as shown in the Table if FIG. 13. It should be noted that in the Table of FIG. 13, there is an increase in StDev between 0.3 and 0.4. This is thought to be anomalous and will improve with more data inclusion.

The system of FIG. 2 provides a portable system that can be quickly installed and operated on a vessel to provide an initial assessment of the vessel's stability and integrity possibly within approximately four minutes. The combination of modern motion sensors, digital signal processing functions, and nautical engineering yield an accurate, empirical stability monitoring system which will enhance shipboard safety. Life saving real time analysis can be completed by validating predictive calculations, providing early alerts to unknown stability issues, and providing accurate and immediate stability calculations following damage. These initial stability assessments can protect military, rescue, and law enforcement boarding teams as they conduct operations on vessels of unknown construction and stability. Other users may be ship captains or the like who may move between vessels and may desire an initial and quick assessment of a vessel that is unfamiliar to them. While the system may be portable, the system may also be permanently installed on a vessel.

Figure 6:
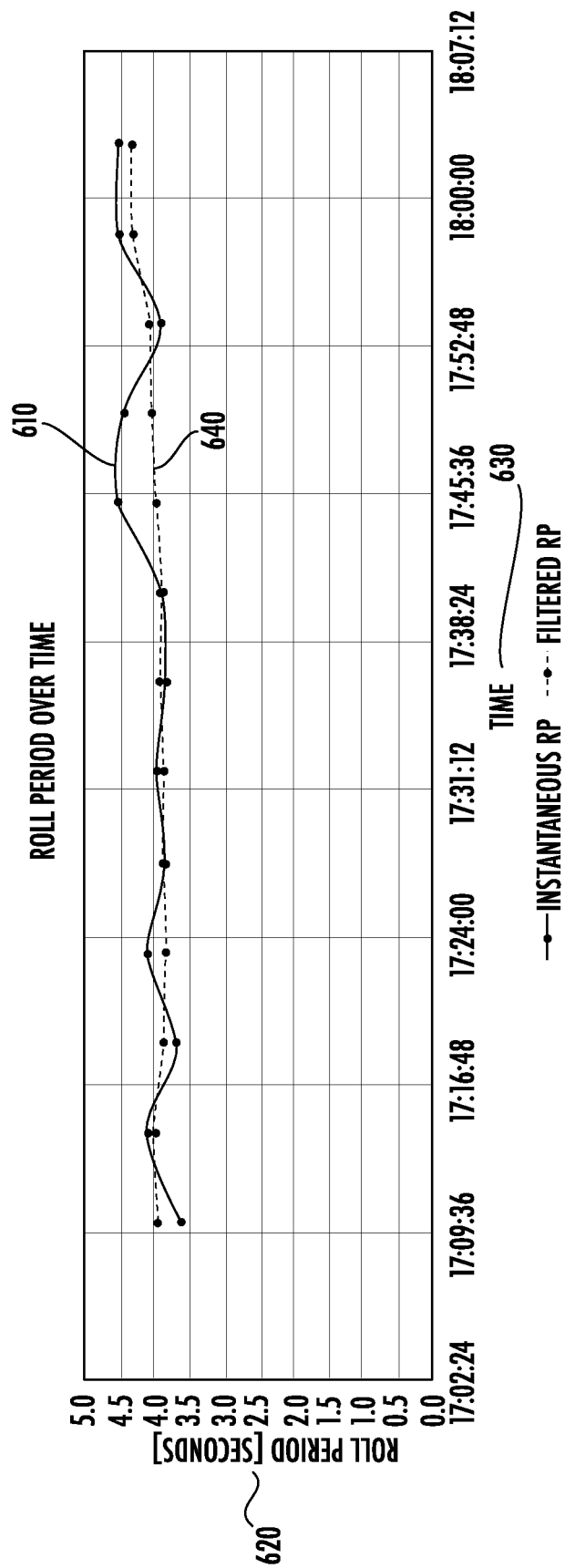
FIG. 6 substantially depicts a graph of a continuing roll period calculation over time.

In additional to the initial assessment, the system may provide ongoing operational data in real-time so that any changes to a vessel's integrity due to dynamic situations, e.g. vessel boarding, ongoing damage, taking on water, loading or unloading of the vessel, changing sea conditions and weather, accumulation of ice, may be quickly calculated and, if necessary, reacted to prior to a catastrophic event occurring. In one embodiment, a continuous roll period may be calculated and displayed over time. FIG. 6 shows a graph 610 of roll period 620 against time 630, including a filtered output 640. In one embodiment, the filtered output may include a 13-minute weighted moving average. A 13-minute averaging period is considered long enough to smooth out short term effects, but short enough to prevent potential adverse conditions from being hidden within the average. Alternatively or in addition, a Kalman filter may be implemented. Roll period may be replaced by the Metacentric Height GM or other integrity data as required.

The system may be programmed to generate notifications, alerts, alarms, etc. when threshold values of roll period or Metacentric height are detected. Threshold levels may be ship dependent, rather than fixed or absolute values, and may be based on user comfort levels. Monitoring of roll period or Metacentric Height may include monitoring of current values, as well as detecting changes over time and using trend data to predict stability issues before they occur.

As described above, the system as herein described may be used to provide a quick assessment of a ship's stability and integrity. During search and rescue and/or Law Enforcement operations, no previous knowledge of a vessel is required. The system is thus able to protect vulnerable boarding team personnel on a vessel of suspect stability. During major damage, immediate stability reports are obtainable while assessment crews look for damage. In any vessel, unknown damage may have occurred or unmeasurable ice accumulation may have occurred, which wouldn't be accounted for by current technology. Thus, every ship could benefit from a roll period sensing device as described herein. A particular advantage is that the roll period sensing device can have a low build cost, making it an accessible device for many smaller vessels and/or for particular use by individual persons or teams, such as ship captains and similar maritime personnel, that may move from ship to ship.

The system described herein may be implemented in various forms. In a basic implementation, ideal for small vessels, boarding teams, etc., the roll period sensing device may be fully contained within a box of approximate dimensions 6"×2"×3". The box may include motion sensors, at least one processor and memory, associated electronics and power supply. In an alternative embodiment, the sensing unit may be a smartphone such as an iPhone/iPad or Android phone or tablet, that utilizes the in-device motion sensors, processing capability and memory. The power supply may be an internal battery, or a connection to a ship supply, such as by USB or other power feed. The memory may store application software for performing the functions of the roll period sensing device described herein. The box may include an interface and input device that enables a user to input required data, including calibration data. In particular, a user may enter a target ship's beam width to be used in metacentric height calculations as well as a minimum design roll period (or maximum design GM). Other vessel specific parameters that may be input through the interface may include, without limitation, roll constant, coefficient of rolling, vessel type, estimated initialization roll period, anticipated daily change in GM or roll period due to fuel consumption, radius of gyration, breadth mould, alarm parameters pertaining to pitch, roll, GM or roll period, etc.

The box may include a simple display that displays real-time roll period and/or metacentric height. Under all conditions, roll period is a useful figure for a ship operator. GM varies with roll period, and is useful as well, but only easily derivable from roll period under smaller roll amplitudes (typically <10 degrees or so). The software may be programmed to include a cutoff so that when the algorithm senses greater than 10 degrees roll, it ceases to update GM, but will always provide roll period. The cutoff value may be a user configurable parameter, but a default cutoff may be programmed into the system.

The display may be programmed to display the stability metrics in other useful representations or forms including, without limitation, one or more of an average or maximum pitch and roll amplitude over a time period The box may include an internal power supply and associated electronics, which may include a replaceable and/or rechargeable battery, for powering the motion sensors, computing components and display. Alternatively, the box may include a power port for connection to an external power supply. The sensor unit may be provided with mounting components to provide easy mounting to the ship. The mounting components may include clips, brackets, adhesives, hook and loop fasteners (Velcro), etc. In use, the user affixes the roll period sensing device box to the ship and allows the device to run for approximately 5 to 15 minutes to obtain initial results. The user now has real time data with which to make informed decisions, supported by risk analysis. For example, vessel masters (and engineers) are typically highly trained in stability, and roll period. An example of risk management may be a ship that is operating with high roll period (low GM); the vessel master may accept that situation if the ship will enter port in calm weather on that day. If the ship has 3 days to go and will potentially pass through a dangerous storm, the master may decide to ballast their tanks to improve stability.

In a larger system e.g. for larger military ships and merchant vessels, the roll period sensing device may have a communications module that is able to receive raw data from existing on-board motion sensors which it may then transform into useful roll period data, and/or communicate motion sensor data and/or roll period analysis data to an external computing system. This external computing system may be located on board the vessel. Alternatively, the data may be communicated to a shore based processing station. Enhanced computing power, i.e. on board or on-shore, may have less stringent power requirements allowing more intensive computing and may provide users with more highly refined motion analysis including higher integrity roll period and metacentric height, in particular for larger vessels that may have widely varying roll periods based on loading state, such as between 2 and 40 seconds. Short roll periods require high sample frequencies, while long roll periods require large sample sizes, thus increasing the time required to produce updates within these ranges.

Coached Inclining Experiment

The inclining experiment is a critical test to determine a vessel's initial stability, or metacentric height (GM). The inclining experiment is conducted in port with loosened dock lines, and consists of observing the precise heel of a vessel as a weight of known value (W) is added, removed, or translated a certain distance (d) laterally across the vessel. The vessel's displacement is known by its freeboard measurements and/or draft observations. With the known weight W translated known distance (d) and the known ship's displacement, the GM can be determined. Typically, the weight is shifted several times (often, 8 times), such that multiple observations of changes in heel are correlated with multiple changes in weight location, validating the results.

Learning the GM of a vessel by employing the inclining experiment, while also learning the Roll Period of the vessel, by agitating it, allows a user to learn the value of the roll coefficient C for that particular loading condition. This can be very helpful in later efforts to correlate GM and Roll Period, possibly while underway. The roll coefficient has varying uses, for example the value "C" in equation 2 above.

Freeboard Measurement

Figure 1A:
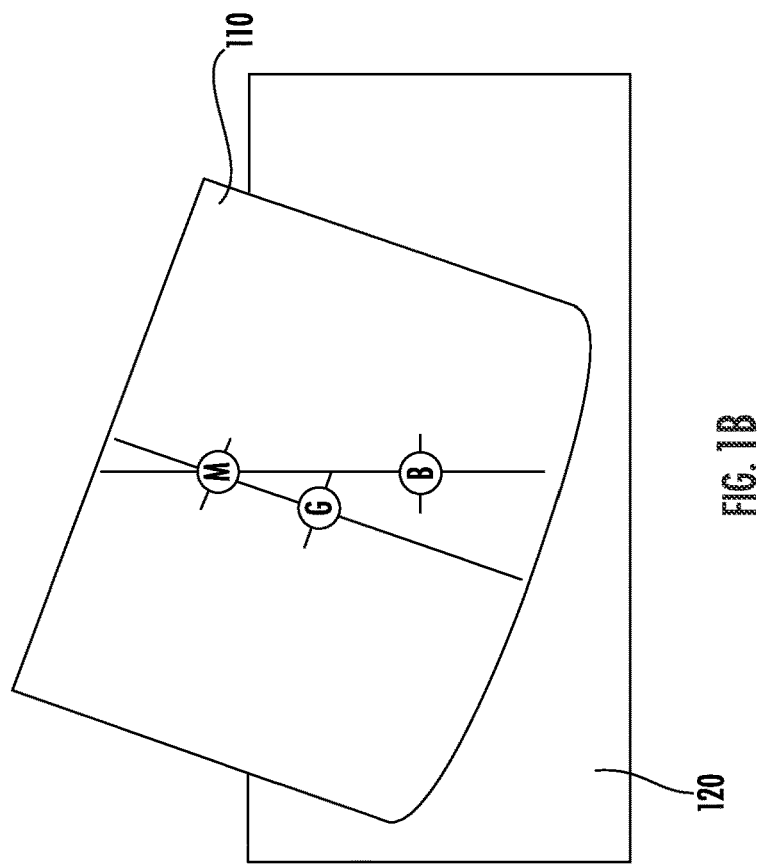
FIG. 1A illustrates stability metrics of a vessel in a state in which the stability metrics are in vertical alignment.
Figure 1B:
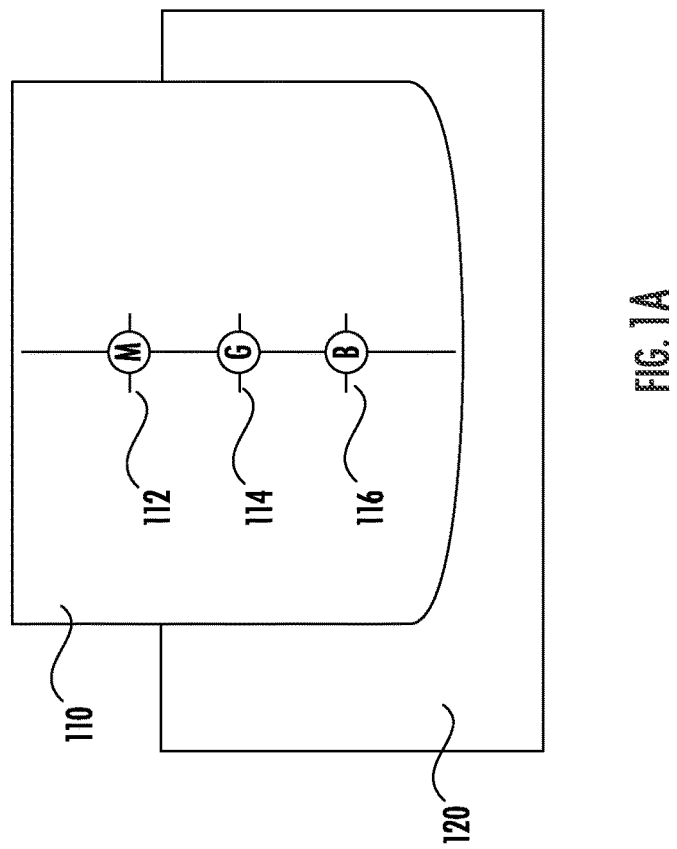
FIG. 1B illustrates stability metrics of a vessel in which the vessel is healing and the stability metrics are not vertically aligned.
Figure 10:
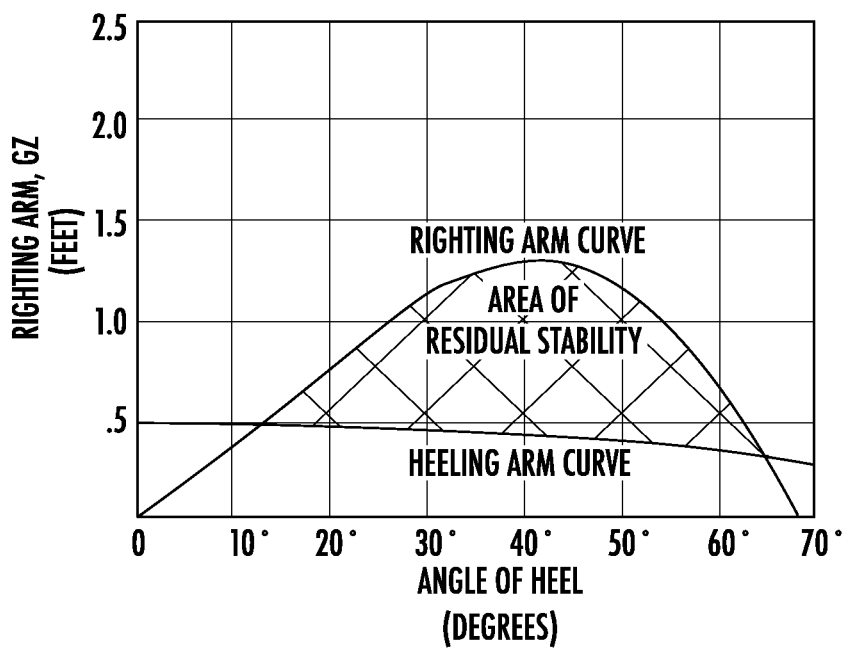
FIG. 10 substantially depicts an example stability curve.
Figure 11:
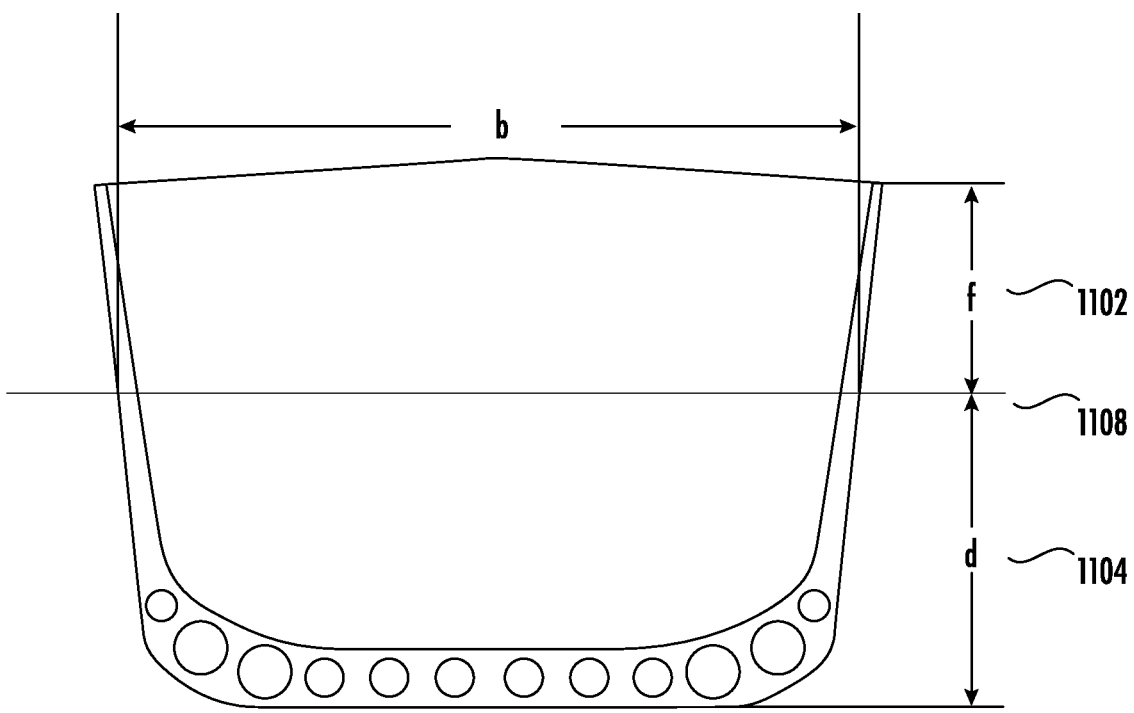
FIG. 11 substantially depicts a schematic of a vessel freeboard.

Initial stability is determined by the Metacentric Height, which is the distance between the body's center of gravity (G) and metacenter (M). Righting arm is the vessel's stabilizing moment that will oppose a heeling arm induced by wind, sea condition, etc. to keep the vessel upright. An example stability curve 1000 (FIG. 10) for a vessel describes residual stability, which is "leftover" righting energy that allows the ship to overcome a heeling force. An important consideration in the residual stability is the vessel's freeboard (f) 1102 (FIG. 11), which directly affects the amount of residual stability the vessel will enjoy. Freeboard is dictated by the vessel's displacement (d) 1104. As displacement increases, freeboard decreases. Also freeboard decreases on one side (increases on the other side) as the vessel heels (FIG. 1B). As weight is added, displacement increases, and the initial stability (GM) may increase or decrease depending on where on the vessel the weight is added. However, in any case, when weight is added, the vessel's freeboard will decrease. While less freeboard may or may not affect the initial stability, it will generally adversely affect the residual stability, and decrease the righting arm at various angles of heel due to seawater more readily accessing the deck or interior of the vessel. It is possible to construct a graphic that charts roll period (or metacentric height) on one axis and freeboard on the other axis. Typically, such a chart would or could be provided by a vessel's manufacturer or produced by a Naval Architect.

Figure 12:
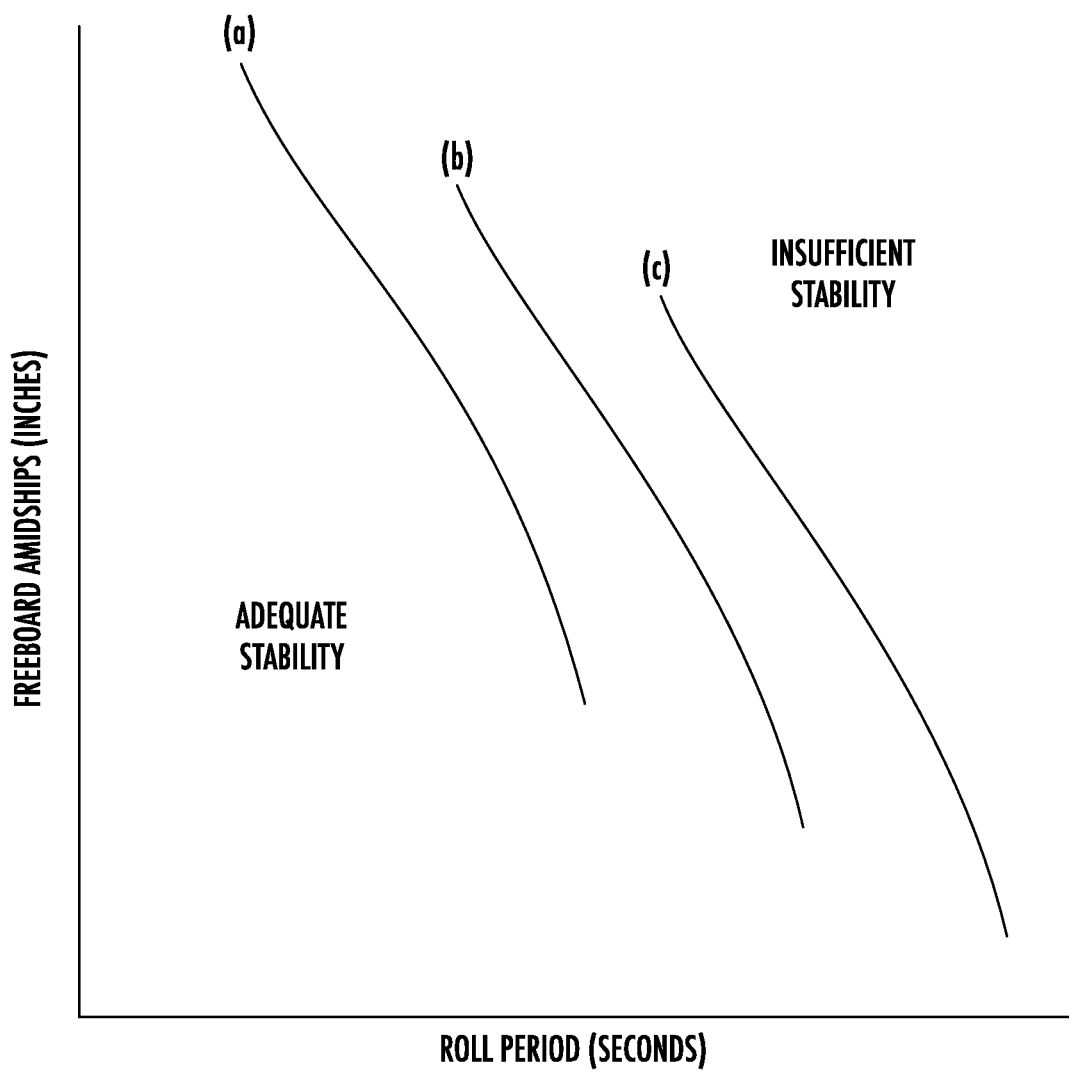
FIG. 12 substantially depicts an example of a freeboard v roll period chart.

The chart, an exemplary form of which is shown in FIG. 12 would then depict regions of acceptable stability and regions of unacceptable stability given freeboard and roll period (or metacentric height) for different load states of the vessel. Different load states may occur, for example, based on changing fuel levels during operation, loading of fishing bays for a fishing trawler, addition of new equipment, shifting of load within the vessel etc. FIG. 12, for example, shows three separate plots. Plot (a) may depict safe and unsafe combinations of freeboard and roll period for a vessel with full tanks, plot (b) may depict safe and unsafe regions for half full tanks (e.g. half the tanks have been fully drained) and plot (c) may be for a state where all of the tanks are nearly empty.

In one aspect of the present invention, there is provided a sensing device for determining freeboard. The sensing device may include one or more range finders for measuring the distance from the vessel's main deck to the water level 1108 external to the hull of the vessel. The sensor may be a range finding distance sensor affixed to the main deck, or it may be a linear fluid sensor or multiple fluid sensors affixed to the external hull of the vessel. Additionally, it may be a sensor or multiple sensors affixed to the interior of the hull, which is capable of sensing the presence of liquid on the opposite side of the hull. Additionally, it may be a pressure sensor affixed to a specific point on the exterior of the vessel's hull, below the waterline, which detects pressure, and can thus be used to determine the depth below waterline of that specific point on the hull. The pressure information can be manipulated to determine freeboard. The determined freeboard could then be used in conjunction with the roll period and metacentric height to rapidly assess the safety of the vessel's current loading state.

In one embodiment, the processor 214 of the sensing unit 210 may be programmed with the Freeboard v Roll Period relationship of FIG. 12 and may receive ongoing displacement related data, such as fuel loads, fish catch levels, passenger levels, etc. As the roll period is calculated, the processor 214 incorporates a freeboard calculation to output an indication of the current stability state of the vessel. The stability state may be indicated as, for example, a position on the chart of FIG. 12 which may be displayed on the display 222, a binary indication of sufficient or insufficient stability (e.g. presented by a status light or audible alert), a status bar which may include a plurality of lights with the number of lights illuminated providing an indication of stability state, or in other forms.

Roll Drift

There is a technological challenge associated with a drifting roll, or heel, solution when using an "isolated" sensor package, which has no absolute, external measurement inputs. An example of an isolated sensor package is a typical 9 degree of freedom sensor package. There are various possible causes for this situation, ranging from vessel motion confusion to magnetic field interference or electromagnetic interference. One possible solution to this situation is implementation of a specialized pendulum, or a modified fluid inclinometer to provide periodically necessary external calibration to fix the roll/heel solution.

In one embodiment, the sensor unit 210 may include a form of inclinometer 228 that can be used for calibrating and recalibrating roll drift. In one specific embodiment, a traditional fluid filled inclinometer could be fitted with two electrodes, such that when a conductive weight passes centerline, a circuit is completed, notifying the system that the vessel was vertical in that instant. Additionally, a similar arrangement could be achieved wherein a traditional fluid filled inclinometer is placed on a cell phone's camera lens. As the vessel passes vertical, the weight would block the light from the camera, indicating to the system that the vessel is vertical in that instant. Additionally, a pendulum could be implemented, which may have a magnet on it. As the vessel passes vertical, the magnet would pass a magnetic pickup, closing a circuit, indicating to the system that the vessel is vertical. Lastly, a potentiometer could be affixed to the pivot point of the pendulum, providing complete roll and heel information to the system at all times.

Figure 7:
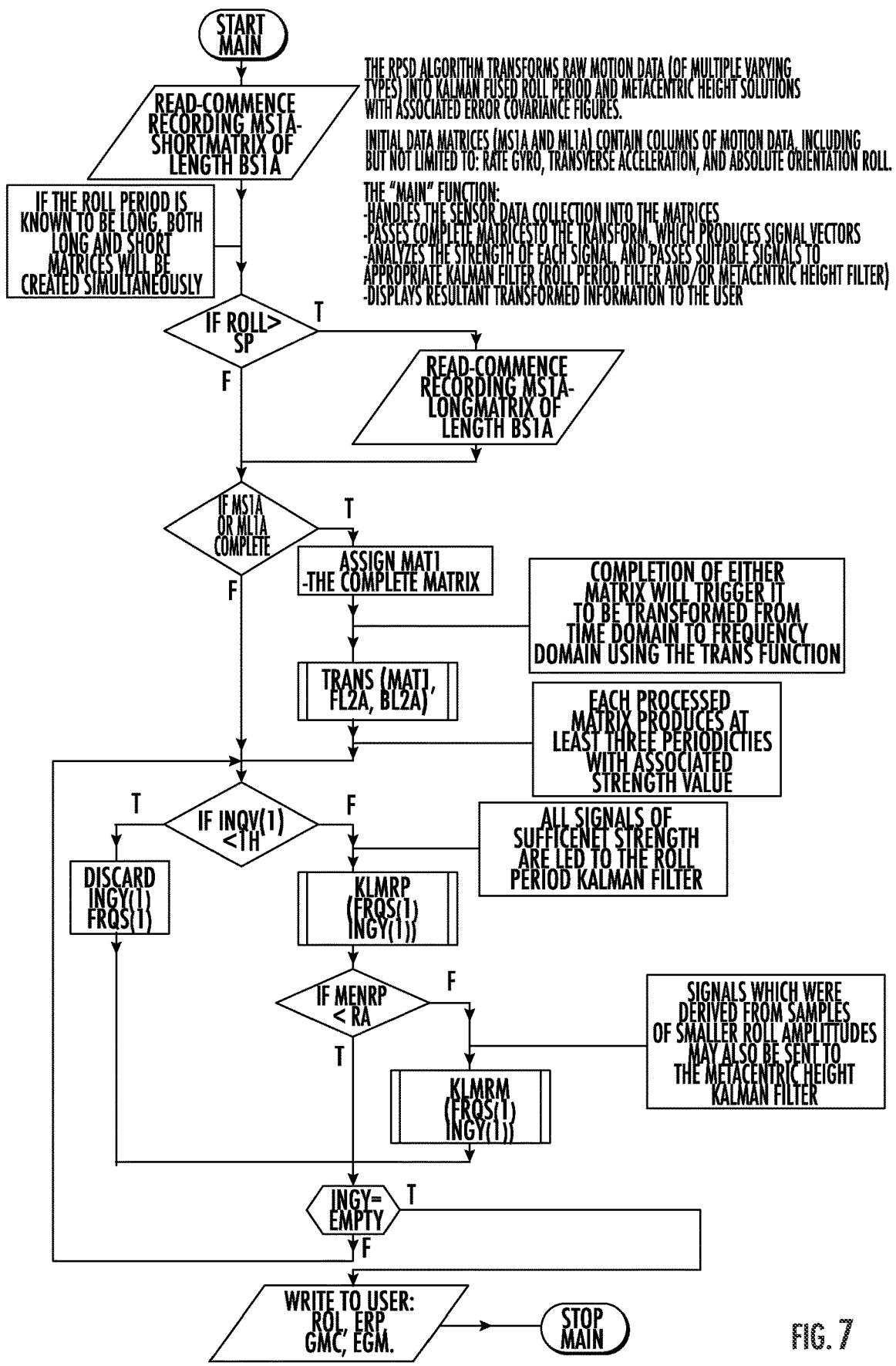
FIG. 7 substantially depicts a main routine of a roll period calculation algorithm.
Figure 8:
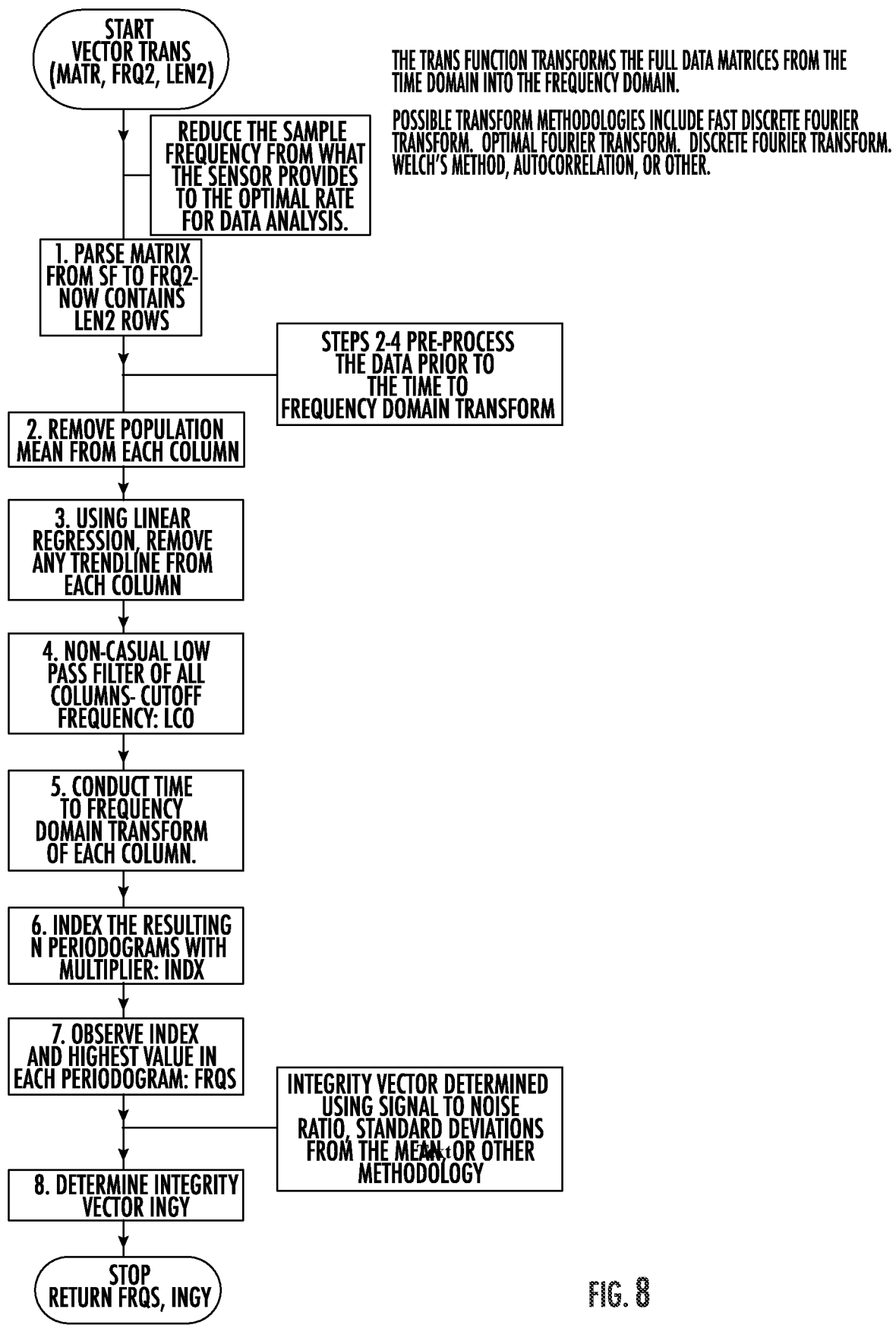
FIG. 8 substantially depicts a transform routine of the roll period calculation algorithm that transforms time domain data to frequency domain data.
Figure 9:
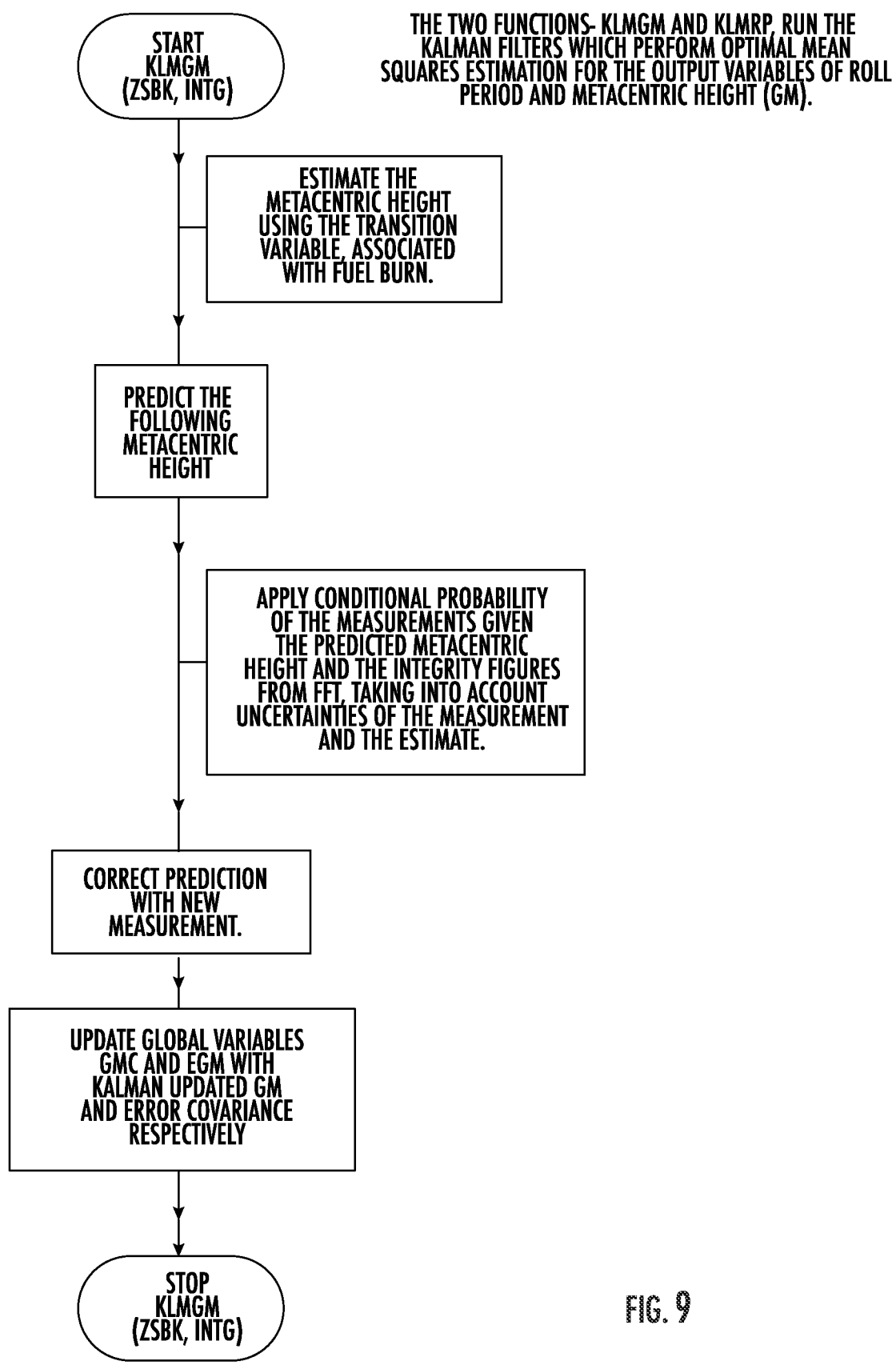
FIG. 9 substantially depicts a filter routine that executes Kalman filters on roll period and metacentric height calculations.

FIGS. 7 to 9 represent flow charts of sub-routines of an algorithm for performing the roll period or metacentric height calculations. The algorithm, labelled RPSD, receives raw motion data, either from internal motion sensors or from third party sensors of a vessel. The RPSD algorithm transforms raw motion data (of multiple varying types) into Kalman fused Roll Period and Metacentric Height solutions with associated error covariance figures. Initial data matrices (MS1A and ML1A) contain columns of motion data, including but not limited to: rate gyro, transverse acceleration, and absolute orientation roll.

A first routine, labelled the "Main" routine is represented by the flowchart in FIG. 7. The Main routine:

collects and handles the sensor data collection into matrices;

passes complete matrices to the TRANSFORM routine, which produces signal vectors;

analyzes the strength of each signal, and passes suitable signals to respective KALMAN Filter routines (Roll Period filter and/or Metacentric Height filter); and displays resultant transformed information to the user.

The Transform routine is represented in FIG. 8. The Transform routine transforms the full data matrices from the time domain into the frequency domain. Possible transform methodologies include Fast Discrete Fourier Transform, Optimal Fourier Transform, Discrete Fourier Transform, Welch's Method, Autocorrelation, or other.

The Kalman routine represented in FIG. 9 includes two functions—KLMgm and KLMrp. These two functions run Kalman Filters which perform optimal mean squares estimation for the output variables of Roll Period and Metacentric Height (GM) respectively.

The following provides pseudocode of the RPSD algorithm related to the routines of FIGS. 7-9 that can be used to calculate roll period and/or metacentric height (GM) calculations.

The pseudocode defines variables as follows:
Variables:
  Inputs (also Global Variables): All units in metric, lengths in meters Required
    B: Vessel's Beam—(Moulded Breadth may be provided in lieu of Beam)
    Optional
    C: Coefficient of Rolling—Defaults to 0.7 (for metric units)
    T: Vessel Type (select among ~8)—Defaults to nil; can be for better default C G: Maximum design GM—Defaults to 5.0 meters
    e: Minimum Design Roll Period—Defaults to C*B/sqrt (G) q: Estimated initialization Roll Period—Defaults to e
    D: Anticipated daily change in GM due to fuel consumption—Defaults to 0
    R: Roll amplitude alarm threshold—Defaults to nil P: Pitch amplitude alarm threshold—Defaults to nil S: GM alarm threshold—Defaults to nil r: Roll period alarm threshold—Defaults to nil
  Tuning Parameters (also Global Variables)
    Ih: Integrity Threshold—Minimum Roll Period Integrity Figure (in frequency domain) for further processing/display to user
    —Defaults to 2.5
    Ra: Roll Amplitude Threshold—Maximum Roll Amplitude (in time domain) for GM to be calculated and provided to user
    —Defaults to 10 degrees
    Rb: Roll Frequency Bias—Adjustment applied to user provided (or system calculated) e to ensure a minimum roll period is observed
    —Defaults to 0.9
    Sf: Sensor Sample Frequency—the frequency of the time series data batch received from the sensor
    —Defaults to 10 Hz May be outside the control of this algorithm; specify minimum of 5 hz
    Mc: Minimum roll cycles, under condition E, for the transform to observe the period.
    —Defaults to 5
    Sp: Roll period threshold to initiate two simultaneous data capture events to ensure adequate roll period precision and updates.
    —Defaults to 30
  Global Variables:
    Rol: Single Decimal of known or believed roll period, received from Kalman filter on each iteration. Initialized as ship's minimum reasonable roll period.
    —Initialized as Rol=q
    —Updated by Kalman Filter
    GMc: Single Decimal of known or believed roll period, received from Kalman filter on each iteration. Initialized as ship's minimum reasonable roll period.
    —Initialized as Rol=q
    —Updated by Kalman Filter
    Egm: "Pk" Kalman Error Covariance for the GM Filter—passed to the user as an integrity figure for the GM solution
    Erp: "Pk" Kalman Error Covariance for the Roll Period Filter—passed to the user as an integrity figure for the Roll Period solution
    Lco: Low pass filter cutoff frequency—the low pass filter will eliminate all values of higher frequency (lower period) than Lco prior to the time-to-frequency domain transform
    —Lco=e*Rb
Functional Variables
Function MAIN
Description:
  Commands reading of the sensors, and handles calling of the TRANS function and the two Kalman functions.
  Under long roll period conditions (where this system must perform at its peak), it may be necessary to conduct simultaneous data capture. In that case, a SHORT matrix (MSA1) will be built, as well as a LONG matrix (MLA1). MSA1 will always be created, and will take between 1 and 22 minutes to build. MLA1 will be created when Rol>=Sp, and will take between 1 and 60 minutes to build.
  BS1A: Batch size 1—integer describing the number of data points in the unparsed short data matrix SS1.
  —Extract from MSCA based on Rol
  MS1A: A matrix of N columns and BS1A number of rows, containing UNPARSED SHORT data.
  —Receive from sensor (via DATAQ)
  FS2A: Short Frequency 2—the desired freq of the SHORT data after it is parsed, prior to the transform
  —Extract from MSCA based on Rol
  BL1A: Batch size 1—integer describing the number of data points in the unparsed long data matrix ML1
  —Extract from MSCA based on Rol
  BS2A: Batch size 2—integer describing the number of data in points in the PARSED SHORT data matrix.
  —Extract from MSCA based on Rol
  BL2A: Batch size 2—integer describing the number of data in points in the PARSED LONG data matrix.
  —Extract from MLCA based on Rol
  ML1A: A matrix of 3 columns and BL1A number of rows, containing UNPARSED LONG data. The columns will contain same data as MS1A.
  —Receive from sensor (via DATAQ)
  FL2A: Long Frequency 2—the desired frequency of the LONG data after it is parsed, prior to the transform
  —Extract from MLCA based on Rol
  Mat1: A Matrix Handling Variable that will transmit a complete matrix to TRANS function
  MenR: Calculated mean amplitude of the absolute orientation roll solution (as provided in ML1A or MS1A). I.e., what is the current ship's roll.
  MenP: Calculated mean amplitude of the absolute orientation pitch solution (as provided in ML1A or MS1A). I.e., what is the current ship's pitch.
  MSCA: Matrix of Short Cycle Rules Table—currently in second sheet of FFT_PreProc.xlsx MLCA: Matrix of Long Cycle Rules Table—currently in third sheet of FFT_PreProc.xlsx RppA: Vector of Roll PERIODs as observed in the frequency domain (seconds)
Function TRANS
Description:
  Will conduct all of the data massaging (parsing, detrending, filtering), the actual transform, and the spectral analysis. All operations will be conducted on each column containing data.
  **Matr: The matrix that will be provided.
  **Frq2: The desired frequency of the matrix after parsing operation \*\*Len2: The length of the dataset after parsing operation, which will parse from Sf to Frq2 Indx: Periodicity index multiplier in Hz
—Indx=(Frq2/2)/(Len2/2)
Sdev: Vector of the standard deviations of each periodogram
Mean: Vector of the means of each periodogram
Frqs: Vector of the roll FREQUENCIES as observed simply as the maximum values in respective periodograms (hz)
Strg: Vector of the strengths of each Frqs when observed in the respective periodograms
Ingy: Vector of integrity figures derived as the number of standard deviations each signal was from the mean.
\*\*\*(Employing standard signal to noise methodology may be better)
—Ingy=(Frqs-Mean)/Sdev
\*\*Will be provided by Main
\*Will be returned to Main
Procedure KLMrp
Description:
   Conducts one dimensional Kalman Filter for the Roll Period post processing.
\*\*Zsbk: "Zk", the measurement value derived from FFT (Frqs vector)
\*\*Intg: Integrity figure derived from FFT (Ingy vector)
RPk0: "X-hat0" The a-priori state variable for roll period
   In each iteration, initialize to Rol
Kalm: "Kk" Kalman Gain
Psbk: "Pk" Prior error covariance
\*RPk1: "X-hat1" The a-posteri state variable for roll period
Atm: "A" Transition multiplier, defaults to 1
Bcon: "B" control multiplier, defaults to 1
Usbk: "Uk", control signal, based on D, defaults to 0
Time: The time elapsed since last iteration of KLMrp (only necessary if using Bcon and Usbk)
\*\*Will be provided by Main
\*Will be returned to Main
Procedure KLMgm
Description:
   Conducts the Kalman Filter for the Metacentric Height (GM) post processing.
\*\*Zsbk: "Zk", the measurement value received from main
\*\*Intg: Integrity figure derived from FFT (Ingy vector)
GMk0: "X-hat0" The a-priori state variable for roll period
   In each iteration, initialize to Rol
Kalm: "Kk" Kalman Gain
Psbk: "Pk" Prior error covariance
Set Err=Psbk after each iteration
\*GMk1: "X-hat1" The a-posteri state variable for roll period
Atm: "A" Transition multiplier, defaults to 1
Bcon: "B" control multiplier, defaults to 1
Usbk: "Uk", control signal, based on D, defaults to 0
Time: The time elapsed since last iteration of KLMrp (only necessary if using Bcon and Usbk)
\*\*Will be provided by Main
\*Will be returned to Main
The pseudocode provides an RPSD program:

```
// Program:   RPSD
// Course:    Mod 2
void main ( )
{
    READ- Commence Recording MS1A- SHORTMatrix of Length BS1A;
    // If the roll period is known to be long, both LONG and SHORT matrices will be
created simultaneously.
    if (If Rol >= Sp)
        READ- Commence Recording MS1A- LONG Matrix of Length BS1A;
    if (If MS1A or ML1A Complete)
    {
        Assign Mat1 = the complete matrix;
        // Completion of either matrix will trigger it to be transformed from time
domain to frequency domain using the TRANS function.
        TRANS (Mat1, FL2A, BL2A);
        // Each processed matrix produces at least three periodicities with
associated strength values
    }
    while (true)
    {
        if (IF Ingy(1) < Ih)
        {
            Discard Ingy(1) & Frqs(1);
        }
        else
        {
            // All signals of sufficient strength are fed to the Roll Period
Kalman Filter
            KLMrp (Frqs(1), Ingy(1));
            if (If MenR < Ra)
            {
                // Signals which were derived from samples of smaller roll
amplitudes may also be sent to the Metacentric Height Kalman Filter
                KLMgm (Frqs(1), Ingy(1));
            }
        }
        if (Ingy = Empty)
            break;
    }
    Write to User: Rol, Erp, GMc, Egm,;
}
Vector TRANS (Matr, Frq2, Len2)
{
```

-continued

```
// Reduce the sample frequency from what the sensor provides to the optimal rate
for data analysis.
    1. Parse Matr from Sf to Frq2--- Now contains Len2 Rows;
    // Steps 2-4 pre-process the data prior to the time to frequency domain transform.
    2. Remove Population Mean from Each Column;
    3. Using linear regression, remove any trendline from each column.;
    4. Non-Causal Low Pass Filter of all columns- Cutoff frequency: Lco;
    5. Conduct time to frequency domain transform of each column.;
    6.Index the resulting N periodograms with multiplier: Indx;
    7. Observe index and highest value in each periodogram: Frqs;
    // Integrity vector determined using Signal to Noise Ratio, standard deviations
from the mean, or other methodology
    8. Determine Integrity Vector Ingy;
    return Frqs, Ingy;
}
void KLMgm (Zsbk, Intg)
{
    // Estimate the Metacentric Height using the transition variable, associated with
fuel burn.
    Predict the following Metacentric Height;
    // Apply conditional probability of the measurements given the predicted
metacentric height and the integrity figures from FFT, taking into account uncertainties
of the measurement and the estimate.
    Correct prediction with new measurement.;
    Update global variables GMc and Egm with Kalman updated GM and error
covariance respectively;
}
void KLMrp (Zsbk, Intg)
{
    // Estimate the Roll Period using the transition variable, associated with fuel burn.
    Predict the following Roll Period;
    // Apply conditional probability of the measurements given the predicted Roll
Period and the integrity figures from FFT, taking into account uncertainties of the
measurement and the estimate.
    Correct prediction with new measurement.;
    Update global variables Rol and Erp with Kalman updated GM and error
covariance respectively;
```

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed, and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A portable sensing device for determining a stability state of a vessel comprising:
   (A) one or more motion sensors for sensing motion data of the vessel;
   (B) one or more freeboard sensors for determining a freeboard of the vessel; and
   (C) a computing system programmed to:
       (a) transform the motion data from time domain motion data to frequency domain motion data;
       (b) process the frequency domain motion data to determine the at least one stability metric of the vessel;
       (c) determine a stability state of the vessel from the stability metric and the freeboard.

2. The portable sensing device of claim 1 wherein the computing system is programmed to determine a roll period of the vessel from the frequency domain motion data.

3. The portable sensing device of claim 1 wherein the computing system is programmed to determine a metacentric height of the vessel from the frequency domain motion data.

4. The portable sensing device of claim 1 comprising a housing that houses the one or more motion sensors wherein the housing is configured to be detachably mounted to a vessel.

5. The portable sensing device of claim 1 comprising an interface for receiving one or more inputs of vessel specific information.

6. The portable sensing device of claim 5 wherein the interface is programmed to receive one or more of a beam width of the vessel, roll constant, coefficient of rolling, vessel type, maximum design GM, minimum design roll period, estimated initialization roll period, anticipated daily change in GM or roll period due to fuel consumption, radius of gyration, breadth mould, alarm parameters pertaining to pitch, roll, GM or roll period.

7. The portable sensing device of claim 1 wherein the computing system is programmed to convert a roll period into a metacentric height of the vessel.

8. The portable sensing device of claim 1 a display for displaying at least one of a roll period of the vessel and a metacentric height of the vessel.

9. The portable sensing device of claim 8 wherein the display is programmed to display one or more of average or maximum pitch and roll amplitude over a time period.

10. The portable sensing device of claim 8 wherein the display is configured to display the stability state.

11. The portable sensing device of claim 10 wherein the display is configured to display the stability state on a graph of freeboard versus roll period.

12. The portable sensing device of claim 10 wherein the display is configured to display the stability state using one or more status lights.

13. The portable sensing device of claim 1 wherein the computing system is programmed to determine the stability state of the vessel using displacement data received into the computing system from the one or more freeboard sensors.

14. A method for determining a stability state of a vessel comprising:
   (A) placing a portable sensing device at a location on the vessel, the portable sensing device including one or more motion sensors for sensing motion data of the vessel and a computing system for processing motion data from the one or more motion sensors to determine a roll period of the vessel; and
   (B) operating the sensing device for a period of time to produce an initial indication of the roll period of the vessel;
   (C) determining a freeboard of the vessel;
   (D) determining a stability state of the vessel from the roll period and the freeboard.

15. The method of claim 14 wherein a period of time to produce the initial indication is less than 5 minutes.

16. The method of claim 14 wherein producing an initial indication of the roll period of the vessel comprises transforming, by the computing system, the motion data from time domain motion data to frequency domain motion data and processing the frequency domain motion data by the computing system to determine the at least one stability metric of the vessel.

17. The method of claim 14 wherein determining the stability state utilizes a displacement of the vessel.

18. The method of claim 14 comprising representing the stability state on a graph of freeboard versus roll period.

19. The method of claim 14 comprising displaying the stability state using one or more status lights.

20. A system comprising at least one device that is programmed to interface directly or indirectly with a third party system of a vessel comprising one or more third party sensors to receive raw motion data from the one or more third party sensors and freeboard data from the one or more third party sensors, transform the motion data into at least one stability metric comprising at least one of a roll period of the vessel or a metacentric height of the vessel, combine the stability metric and the freeboard data to determine a stability state of the vessel.

21. The system of claim 20 wherein the at least one device is programmed to communicate the one or more of the at least one stability metric and the stability state to the third party system.

22. A method for determining at least one stability metric of a vessel comprising:
   (A) placing a portable sensing device at a location on the vessel, the portable sensing device including one or more motion sensors for sensing motion data of the vessel and a computing system for processing motion data from the one or more motion sensors to determine a roll period of the vessel; and
   (B) operating the sensing device for a period of time to produce an indication of the roll period of the vessel;
   (C) ascertaining the precision or accuracy of the sensed roll period;
   (D) determining the at least one stability metric of the vessel from the roll period.

23. The method of claim 22 comprising deriving an integrity figure from the ascertained precision or accuracy that provides a user with a representation of the quality of the data being produced.

24. The method of claim 23 wherein the integrity figure is may be presented as one or more visual depictions of the data, one or more audible alerts, or one or more emergency notifications.

25. The method of claim 22 wherein producing the indication of the roll period of the vessel comprises transforming, by the computing system, the motion data from time domain motion data to frequency domain motion data and processing the frequency domain motion data by the computing system to determine the roll period of the vessel.

26. The method of claim 25 comprising determining a normalized energy variance of the roll period from the frequency domain motion data and providing the normalized energy variance as an input to a filter algorithm, wherein the normalized energy variance provides an indicator of how heavily to weight the determined roll period against previous measurements.

27. The method of claim 22 comprising determining a freeboard of the vessel and determining a stability state of the vessel from the roll period and the freeboard.

28. A computer readable medium comprising instructions executable by at least one processer that, when executed, cause the at least one processor to interface directly or indirectly with a third party system of a vessel comprising one or more third party sensors to receive raw motion data from the one or more third party sensors and freeboard data from the one or more third party sensors, transform the motion data into at least one stability metric comprising at least one of a roll period of the vessel or a metacentric height of the vessel, combine the stability metric and the freeboard data to determine a stability state of the vessel.

29. The computer readable medium of claim 28 comprising instructions that, when executed, cause the at least one processor to transform the motion data from time domain motion data to frequency domain motion data and process the frequency domain motion data to determine the at least one stability metric of the vessel.

* * * * *